United States Patent
Kämpf

[11] Patent Number: 5,170,870
[45] Date of Patent: Dec. 15, 1992

[54] SWITCHABLE FREEWHEELING RATCHET UNIT

[75] Inventor: Klaus Kämpf, Lohmar, Fed. Rep. of Germany

[73] Assignee: Jean Walterscheid GmbH, Lohmar, Fed. Rep. of Germany

[21] Appl. No.: 746,115

[22] Filed: Aug. 15, 1991

[30] Foreign Application Priority Data

Aug. 18, 1990 [DE] Fed. Rep. of Germany ....... 4026211

[51] Int. Cl.$^5$ .................... F16D 11/02; F16D 41/16
[52] U.S. Cl. ................................ 192/28; 188/82.2; 192/35; 192/43.1
[58] Field of Search ............. 192/28, 43.1, 43, 35, 192/46; 188/82.2, 82.3, 82.4

[56] References Cited

U.S. PATENT DOCUMENTS

| | | | |
|---|---|---|---|
| 841,179 | 1/1907 | Putnam | 192/43.1 |
| 1,442,003 | 1/1923 | Rohrer | 192/43 X |
| 1,835,675 | 12/1931 | Smith et al. | 188/82.2 X |
| 2,681,718 | 6/1954 | Stoner | 192/139 |
| 2,720,296 | 11/1955 | Briglia | 192/43.1 |
| 2,773,574 | 12/1956 | Able | 192/43.1 |
| 3,149,707 | 9/1964 | McInnis | 192/43.1 |
| 3,319,749 | 5/1967 | Saeger | 192/27 |
| 3,432,015 | 3/1969 | Schwerdhofer | 192/43.1 |
| 3,511,348 | 5/1970 | Jonsson et al. | 192/43.1 |
| 3,557,922 | 1/1971 | Schwerdhoefer | 192/64 |
| 4,460,077 | 7/1984 | Geisthoff | 192/28 X |
| 4,466,523 | 8/1984 | DeCarolis et al. | 192/43.1 |
| 4,520,697 | 6/1985 | Moetteli | 192/43.1 X |
| 4,629,044 | 12/1986 | Post et al. | 192/28 |
| 4,966,336 | 10/1990 | Humble et al. | 188/82.2 X |
| 5,054,594 | 10/1991 | Kampf et al. | 192/35 |

FOREIGN PATENT DOCUMENTS

| | | |
|---|---|---|
| 121831 | 7/1901 | Fed. Rep. of Germany . |
| 293328 | 8/1916 | Fed. Rep. of Germany . |
| 1888456 | 6/1961 | Fed. Rep. of Germany . |
| 1575963 | 2/1972 | Fed. Rep. of Germany . |
| 3116796 | 3/1982 | Fed. Rep. of Germany . |
| 373187 | 5/1932 | United Kingdom . |

*Primary Examiner*—Rodney H. Bonck
*Attorney, Agent, or Firm*—Harness, Dickey & Pierce

[57] ABSTRACT

The invention relates to a switchable freewheeling ratchet unit 1a having a coupling sleeve 2 and a coupling hub 5 as well as radially resilient locking ratchets 13 and 38 per direction of rotation, which engage recesses 11 and 39 of the coupling hub 5 and which, depending on the direction of rotation, may be disengagable from the coupling hub 5 by a control ring 23 with control elements 21. The control elements 21 have first control faces 19, 19a and the locking ratchets 13 and 38 have second control faces 18, 18a facing the first control faces 19 and 19a for freewheeling purposes. The locking ratchets 13 or 38 not serving torque transmitting purposes are completely disengaged from the recesses 11 and 39, respectively, and are out of contact with the coupling hub.

16 Claims, 6 Drawing Sheets

SWITCHABLE FREEWHEELING RATCHET UNIT

BACKGROUND AND SUMMARY OF THE INVENTION

The invention relates to a switchable freewheeling two direction ratchet unit. The ratchet unit includes a coupling hub and coupling sleeve which, in the driving direction of rotation, are non-rotatingly connectable to each other via locking ratchets. The locking ratchets are held radially resiliently in first recesses of the first of the two coupling parts. The locking ratchets engage in recesses of the other coupling part, with the locking ratchets being disengagable from the recesses of the other coupling part via a control ring, control elements and a switching device. The control ring carries the control elements and is associated with a first coupling part so as to be pivotable to a limited extent. The control elements include first control faces on the locking ratchets. The control faces oppose each other and, depending on the position of the control ring, the control faces either contact each other or do not contact each other.

A freewheeling ratchet unit is known from U.S. patent Ser. No. 3,557,922. However, this freewheeling ratchet unit is suitable for rotation in only one direction.

DE 35 28 591 C2 illustrates a freewheeling unit with a coupling sleeve recess engaged by a locking ratchet in the torque transmitting position by a radially movable control pin with the locking ratchet being moved inwardly. During the relative movement of the coupling sleeve and coupling hub, the ratchet is pressed into contact with the bearing bore of the coupling sleeve by spring pressurizing it radially outwardly. This leads to increased wear.

It is the object of the present invention to propose a freewheeling ratchet unit which is suitable for the transmission of torque in two directions of rotation. In accordance with the invention, the first coupling part is associated with two sets of locking ratchets which, in the two opposed directions of rotation, are engaged with or disengaged from the recesses of the other coupling part. The control elements radially engage between two sets of associated locking ratchets and, for the purpose of operating the locking ratchets, include control faces pointing in opposite circumferential directions.

The advantage of this design is that when disengaged from the control elements, the locking ratchets are held in a lifted position vis-a-vis the coupling part rotating relative thereto. The respective locking ratchets are lifted as a function of the direction of rotation for one of the two torque transmitting directions. In addition, it is proposed that the locking ratchets, when disengaged from the control elements, should be held so as to be enclosed in the first recesses.

In a preferred embodiment, the control elements are designed to be mirror-symmetrical relative to radial axes of the sleeve and hub. Preferably, the coupling sleeve constitutes the first coupling part with the control faces of the control elements extending underneath the locking ratchets to associate the control elements, position the control ring as well as arrange the switching device.

Lifting of the ratchets is preferably achieved by the control faces of the control elements. The locking ratchets, in opposition to the driving direction of rotation, extend at a radially increasing distance relative to the axis of rotation. As the control ring and thus the control elements are held back for the purpose of being switched off relative to the driving coupling part, the control faces of the locking ratchets slide on the control elements in the direction opposite to the direction of rotation, with the locking ratchets being moved radially outwardly out of the locking recesses in the second coupling part, i.e. the coupling hub.

In order to achieve uniform disengagement of the locking ratchets, the control faces are arranged centrally relative to the locking ratchets and form part of a recess. However, the control faces may also be arranged laterally.

In a preferred embodiment, starting from the control ring, the control elements radially pass through an aperture in the first coupling part. The control elements, in their end positions in the circumferential direction, are supported on one of the two circumferential limiting faces of the apertures or the control ring abuts against stops at the coupling part relative to which it is movable. In this way, it is possible to do without guiding the control ring in a groove.

To facilitate assembly, the control elements are releasably connected to the control ring.

For controlling the control ring, it is proposed in a further embodiment of the invention that the first coupling part should be associated with ramp faces. The ramp faces provide a fixed stop or a switching device. Also, the control ring or the control elements include retaining lugs radially projecting beyond the contour of the control ring. Thus, depending on the direction of rotation, the retaining lugs will be stopped or released by the ramp faces.

The switching device for operating the control ring may be designed in different ways. Thus, the switching device may consist of a radially resilient journal constituting a stop or of a pivotable angle lever with a pair of stops. However, it is also possible for the control ring to be loaded by a braking device.

In order to achieve rigid coupling of the output unit in both directions of rotation, it is proposed in a further embodiment of the invention to move the control ring into a central position where the locking ratchets of the two sets of locking ratchets simultaneously engage in the recesses of the coupling part. For such a design of a freewheeling ratchet unit, in particular, there is provided a switching unit in the case of which a control sleeve includes a control slot intersecting the axis of rotation which is non-rotatingly, but axially movably associated with the first coupling part. A control pin radially projects from the control ring and is guided in the control sleeve and the control sleeve is axially movable, via a switching fork or a similar switching element, which is externally operated and engages a switching groove in the control sleeve.

From the following detailed description taken in conjunction with the accompanying drawings and subjoined claims, other objects and advantages of the present invention will become apparent to those skilled in the art.

DETAILED DESCRIPTION OF THE DRAWINGS

DETAILED DESCRIPTION OF THE PREFERRED EMBODIMENTS

Figure 3:
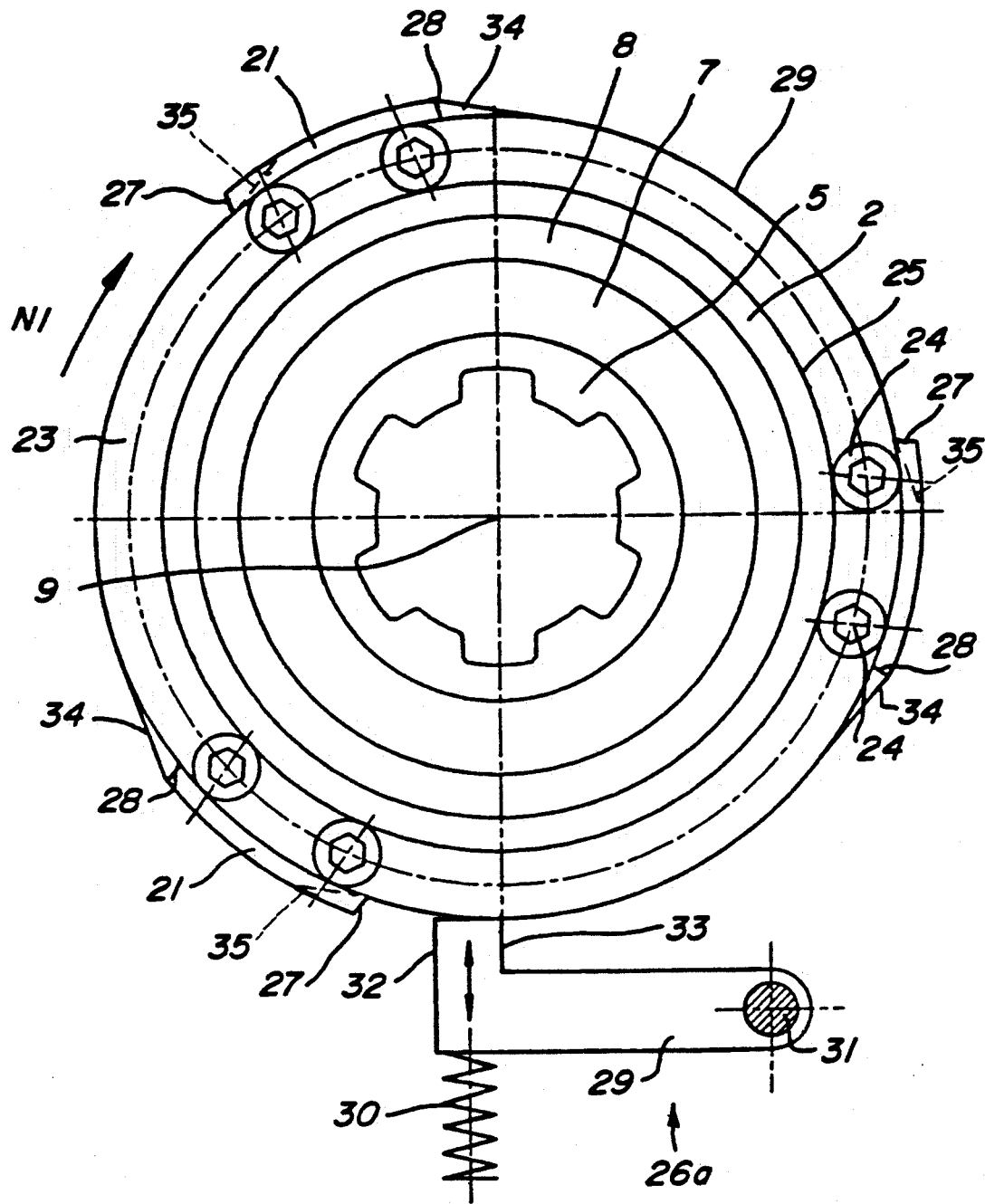
FIG. 3 is an end view in the direction of arrow B of FIG. 1, showing an alternative design of a switching device.
Figure 4:
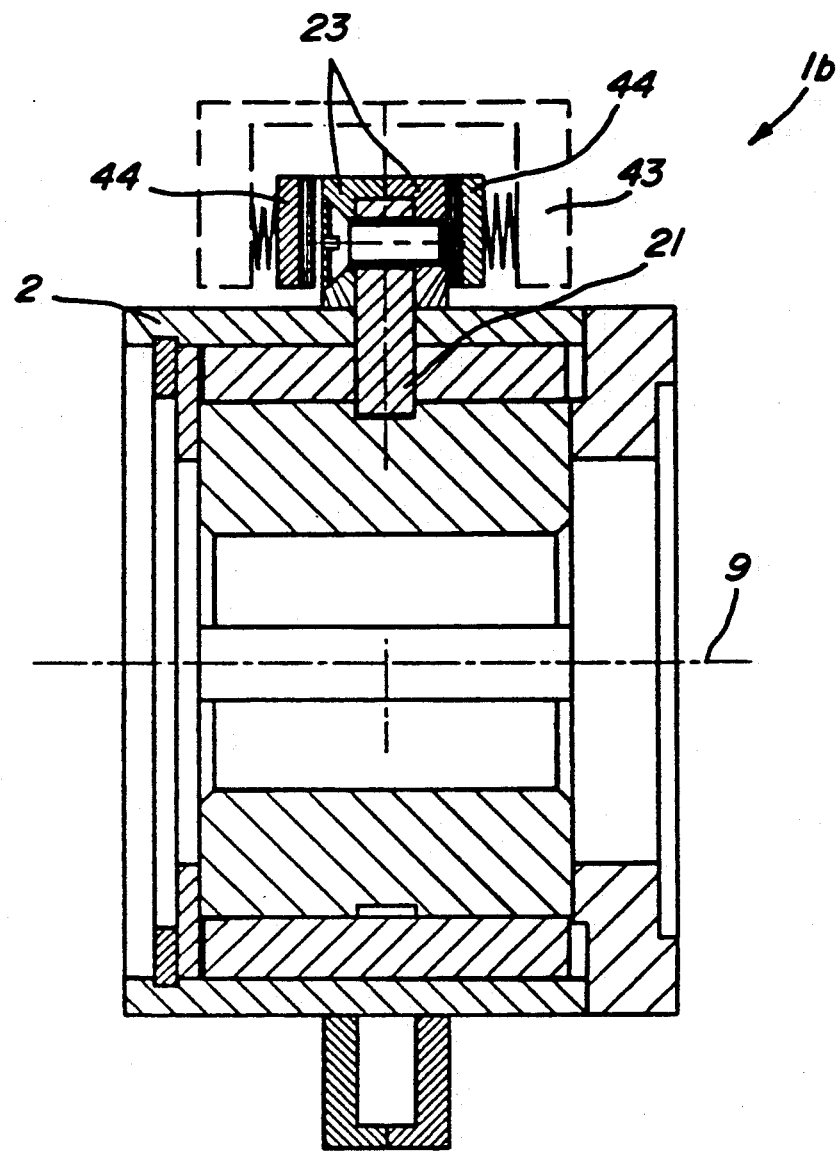
FIG. 4 is a longitudinal sectional view of another embodiment of a freewheeling ratchet unit with a braking device for the control ring.
Figure 5:
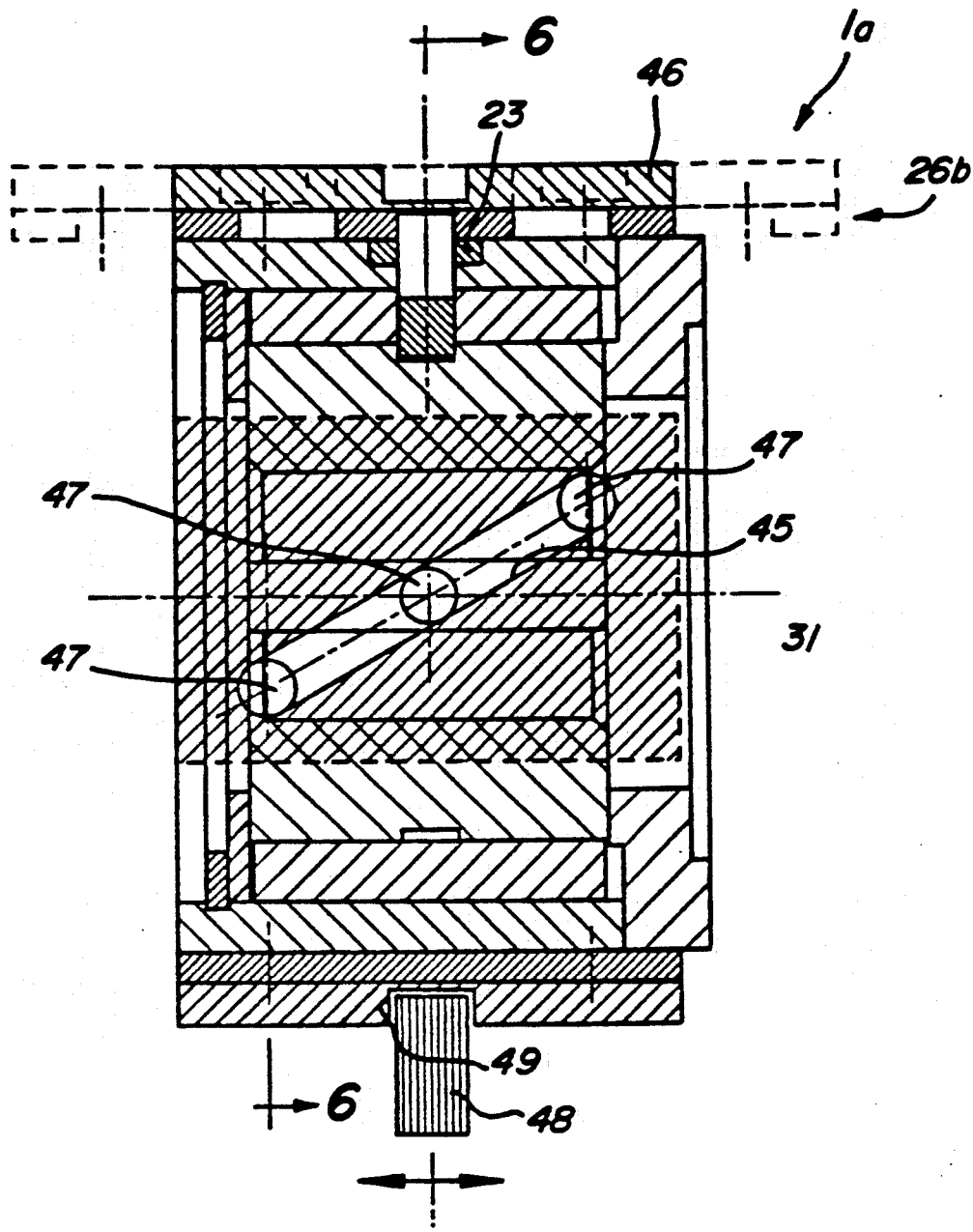
FIG. 5 is a longitudinal view of another embodiment of a freewheeling ratchet unit having a further alternative braking device for the control ring.
Figure 6:
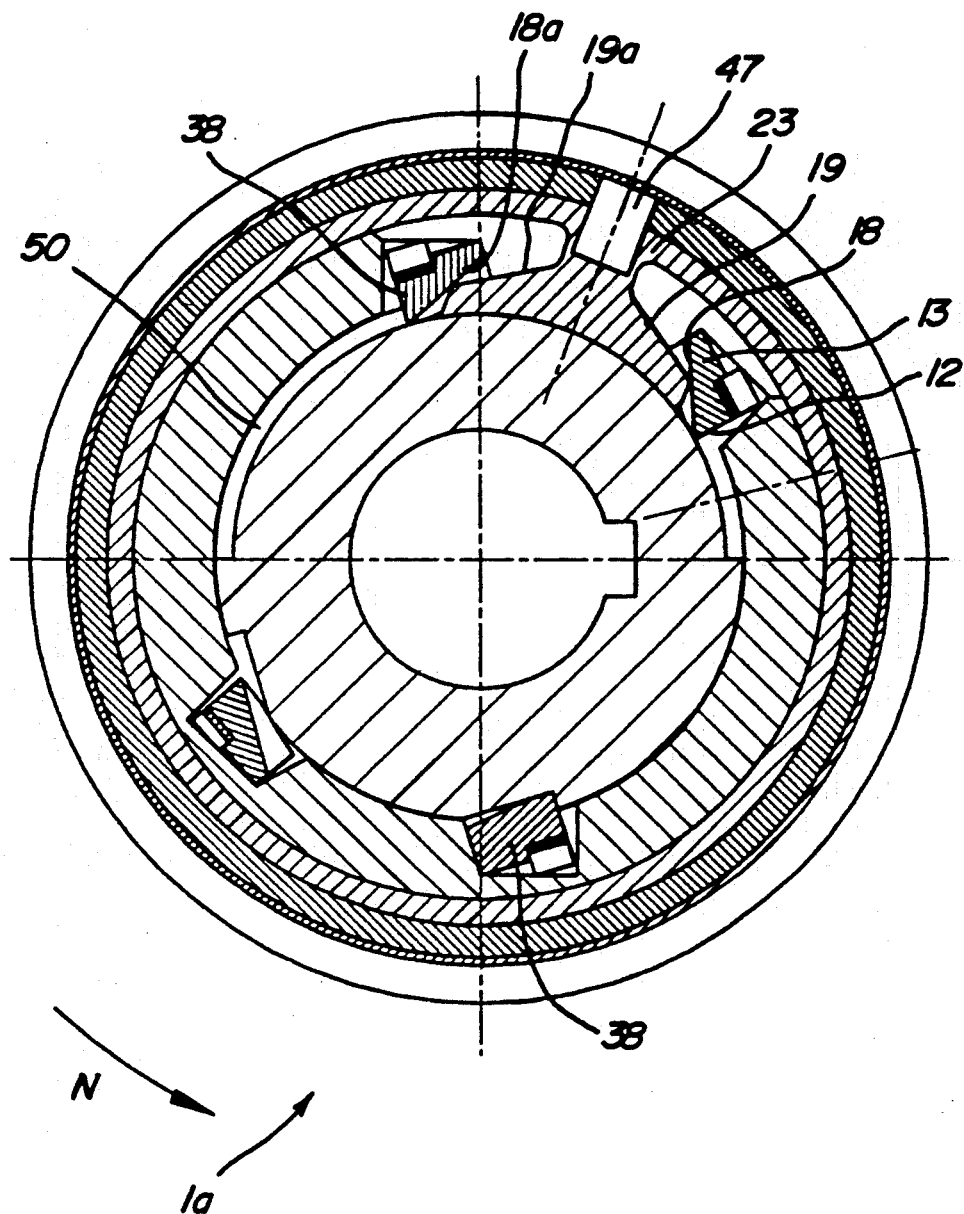
FIG. 6 is a sectional view of FIG. 5 along the line 6—6 thereof.

The freewheeling ratchet units 1a and 1b as shown in FIGS. 1 to 6 are suitable for the transmission of torque in two directions of rotation. Furthermore, the freewheeling ratchet unit 1b according to FIGS. 5 and 6 provides for blocking the freewheeling function in both rotational directions.

The freewheeling ratchet unit 1a includes a coupling sleeve 2, constituting the first coupling part which is the driving coupling part. A flange 3 is welded to one end of the coupling sleeve 3 and serves to non-rotatingly connect the freewheeling coupling 1 to a rotary drive (not illustrated). The coupling sleeve 3 includes a central cylindrical bore 4 rotatably accommodating a coupling hub 5 in its cylindrical outer face 6.

The coupling hub 5 has one end face which rests against a radial face of the flange 3. Its other end face is guided at a stop disc 7, which is axially fixed to the coupling sleeve 2 by a securing ring 8. The coupling hub 5 is rotatably relative to the coupling sleeve 2 held around the axis of rotation 9. The coupling hub 5 includes a central bore 10 which may be provided with a multi-wedge profile which serves to connect the hubs to a driving pin of a machine part to be driven via the freewheeling ratchet unit 1a or for driving the wheels of a vehicle.

Figure 1:
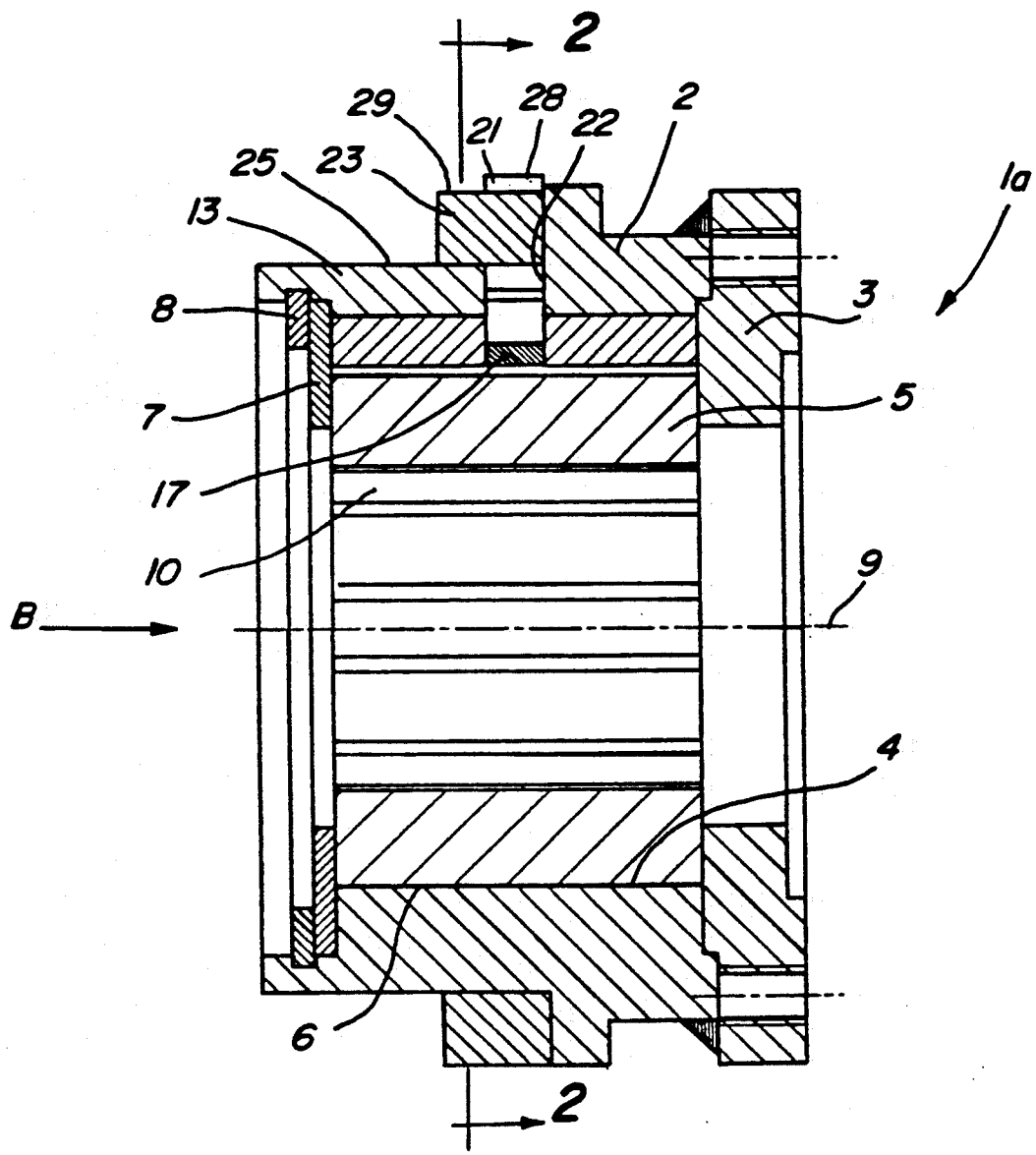
FIG. 1 is a longitudinal sectional view of a two directional freewheeling ratchet unit in accordance with the present invention.
Figure 2:
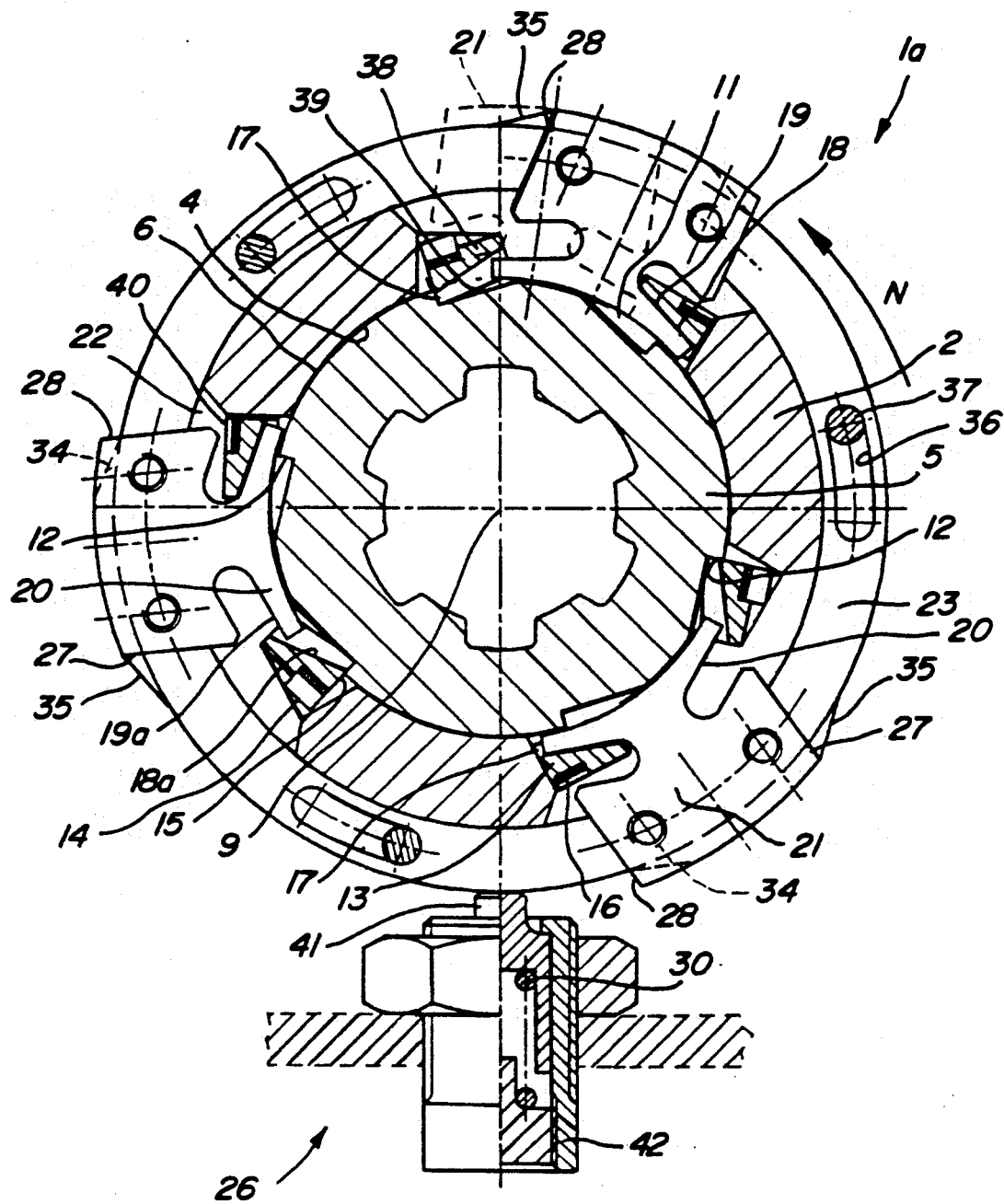
FIG. 2 is a sectional view of FIG. 1 along the line 2—2 thereof.

The outer face 6 of the coupling hub 5 includes circumferentially distributed first recesses 11 for first locking ratchets 13 and second recesses 39 for second locking ratchets 38. Each recess has a radially extending support face 12. Depending on the torque transmitting direction, the support faces 12 are engaged by either the first locking ratchets 13 or second locking ratchets 38. If torque is transmitted in the direction of rotation N as seen in FIG. 2, the second locking ratchets 38, arranged so as to be supported in second recesses 40 of the coupling sleeve 2, are supported with their supporting face 15 engaged with the supporting face 12 of the recess 39 of the coupling hub 5.

Via springs 16, supported in the recesses 14, 40 of the coupling sleeve 2, all the locking ratchets 13, 38, are loaded in the direction of the recesses 11 and 39, respectively, of the coupling hub 5. The locking ratchets 13 and 38 are circumferentially distributed in the recesses 14 and 40 starting from the bore 4 of the coupling sleeve 2 in accordance with the recesses 11 and 39 of the coupling hub 5.

In the center of the their longitudinal extension, all locking ratchets 13 and 38 have a recess 17, provided with a control face 18 and 18a, respectively, and depending on the direction of rotation, are engaged with one of the control faces 19 and 19a of the two control projections 20 of the control element 21 mirrored relative to the radial line R. The control faces 18, 19 and 18a, 19a are inclined in the same direction, with the control faces 19 and 19a extending so as to rise in a direction in opposition to the driving direction of rotation N and $N_1$, respectively, with their radial distance increasing from the axis of rotation 9.

The control elements 21 pass through radial apertures 22 in the coupling sleeve 2 and are releasably attached to a common control ring 23 by bolts 24. The control elements 21 are guided in the apertures 22 in the circumferential direction so as to be laterally pivotable, i.e. around the axis of rotation 9. As a result of this type of guidance, the control ring 23, with its bore, is guided on the outer face 25 of the coupling sleeve 2 with the control elements 21 ensuring lateral guidance and support. The relative rotational position of the control ring 23 and thus the position of the control elements 21 relative to the locking ratchets 13 and 38 is influenced by a switching device 26 or 26a.

FIGS. 2 and 3 illustrate alternative switching devices 26 and 26a. Both act on retaining lugs 27 and 28 which are formed either by the faces of the control element 21 projecting beyond the outer face 29 of the control ring 23 or by projections of the control ring 23. Depending on the driving direction of rotation N or $N_1$, the retaining lugs 27 and 28 are either released or stopped by the adjoining ramp faces 34 and 35 projecting from the outer contour of the coupling sleeve 2. In the case of the embodiment illustrated in FIG. 2, the ramp faces 35 abut the retaining lugs 27 of the control elements 21, so that upon rotation of the coupling sleeve 2 in the driving direction of rotation N, the journal 41 slides on the ramp face 35 and its stop face cannot be brought into contact with the retaining lug 27.

In the illustration as seen in FIG. 2, the freewheeling ratchet unit 1a is in the torque transmitting position in the direction of rotation N, which is the driving direction of the coupling sleeve 2. The second locking ratchets 38 engage the coupling hub 5 whereas the first locking ratchets 13 are lifted by the control faces 18 and 19 out of the recesses 11 of the coupling hub 5. For switching over, there is provided a switching device 26 illustrated in FIG. 2, which includes a journal 41 which is supported against a spring 30 and which is movable in a fixed sleeve 42.

In the position as illustrated in FIG. 2, with the direction of rotation N, the journal 41 escapes radially outwardly via the ramp faces 35 abutting the retaining lugs 27. In the case of a driving direction of rotation in opposition to N ($=N_1$), the journal 41 contacts the retaining lug 28. In the process, the control ring 23 is adjusted relative to the coupling sleeve 2, with the second locking ratchets 38 being lifted out of the second recesses 39 of the coupling hub 5 and moved fully into the second recesses 40 of the coupling sleeve 2, due to contact between the control faces 18a, 19a. At the same time, the control elements 21 release the first locking ratchets 13 which, for torque transmitting purposes, engage the recesses 11. This condition is explained with reference to FIG. 3 in connection with an alternative switching device 26a.

For switching the freewheeling ratchet unit 1 into the torque transmitting position int the direction of rotation $N_1$ according to FIG. 3, it is essential to switch over the drive so that the driving coupling sleeve 2 is rotated in opposition to the driving direction of rotation N into the direction of rotation $N_1$. In the process, the journal 41, with its stop face, comes to rest against the retaining lug 28. If the coupling sleeve 2 continues to rotate in the new driving direction of rotation $N_1$, the control ring 23 remains in its position of rest and is adjusted relative to the coupling sleeve 2. In the process, the control faces 19 and 18 of the control elements 21 and of the locking ratchets 13, respectively, are moved away from one another. Under the force of the spring 16, the locking ratchets 13 may swivel radially inwardly out of the recesses 14 of the coupling sleeve 2 to be able to engage the recesses 11 of the coupling hub 5 upon rotation of the coupling sleeve 2 in the new driving direction of rotation $N_1$.

During the relative movement of the control ring 23 relative to the coupling sleeve 2, the rising ramp faces 35 reach the region of the retaining lugs 27 and are progressively covered. In the process, because the control faces 18a of the second locking ratchet 38 slide on the control faces 19a of the control elements 21, the second locking ratchets 38 are lifted out of the second recesses 39 of the coupling hub 5, whereas the locking ratchets 13 drop into the recesses 11 in engagement with faces 12 to drive the coupling hub 5. The relative adjustment in the direction of rotation of the coupling sleeve 2 and control ring 23 relative to each other may be limited by the control elements 21 stopping against the limiting faces of the apertures 22 in a circumferential direction or via the length of one or several slots 36 in the control ring 23 contacting a stop journal 37.

The switching device 26a according to FIG. 3 consists of an angle lever 29 loaded by a spring 30 and arranged so as to be pivotable around a fixed point of rotation 31. The angle lever 29 comprises two stop faces 32 and 33 which may be brought into contact with the retaining lugs 27 and 28. As for torque transmitting purposes, the freewheeling ratchet unit 1a is designed for two directions of rotation. There is no need for the switching device 26a to be made ineffective.

For torque transmitting purposes, the angle level 29 must not be in contact with the outer contour of the control ring 23. It is not activated until disengagement is required. Disengagement is achieved similarly to engagement, but with the stop face 33 coming into contact with the retaining lug 28 and release being effected by lifting off of the locking ratchets 13.

In all the above-described embodiments, the coupling hub 5 is able to overtake the coupling sleeve 2 in the respective driving direction of rotation N or $N_1$, with the locking ratchets 13 or 38, which are in the torque transmitting position, escaping radially outwardly against the first of the spring 16 loading them.

In the case of a freewheeling ratchet unit according to FIG. 4, the control elements 21 are embraced by a divided control ring 23 designed as a breaking ring. For switching and braking, the control ring 23 relative to the coupling housing 2, brake jaws 44, resiliently supported via a switching yoke 43, are held in parallel to the axis of rotation 9. The brake jaws 44 are longitudinally movable but non-rotatable. The jaws 44 may be brought into contact with the control ring 23 by a piston cylinder unit. On the right, the brake jaws 44 are shown in contact with the control ring 23 and on the left they are shown not in contact. Via the piston rod, the pressurizable piston cylinder unit is supported on a brake jaw 44 and via its cylinder it is supported on the switching yoke 43.

In the case of the freewheeling ratchet units 1b according to FIGS. 5 and 6, it is not only possible to switch to respective opposite driving directions of rotation N and $N_1$, respectively, but provision has also been made for blocking the freewheeling ratchet unit 1b with both the first locking ratchets 13 and the second locking ratchets 38 engaging their associated recesses 11 and 39, respectively, of the coupling hub 5. For this purpose, it is necessary to provide an external switching device 26b which permits an additional central position where none of the control faces 18 and 19 as well as 18a and 19a of the control elements 2; are in contact with each other.

FIG. 5, in the center, shows a circumferential portion with reference to the arrangement of the control journal 47 and the control slot 45. It can be seen that the control slot 45 extends at an angle and intersects the axis of rotation 31. The different positions of the control journal 47 relative to the control slot 45 can also be identified. The control elements 21 form part of the control ring 23. The upper half of FIG. 6 shows that the control elements 21 engage a groove 50 of the coupling hub 5. It can also be seen that in the upper half both locking ratchets 13 and 38 engage the coupling hub 5 whereas the lower half only shows the engagement of the locking ratchet 38 for the direction of rotation N. The control journal 47 is inserted into the control ring 23 so as to extend radially while projecting radially outwardly into the control slot 45 of the control sleeve 46, the latter being non-rotatable but axially movable along the axis of rotation 31. For this purpose it is guided between guiding means.

In addition, FIG. 5, in dashed lines, shows the changed positions of the control sleeve 46. Adjustment is effected by an externally operated switching element 48 which engages a switching groove 49 of the control sleeve 46.

While the above detailed description describes the preferred embodiment of the present invention, the invention is susceptible to modification, variation, and alteration without deviating from the scope and fair meaning of the subjoined claims.

I claim:

1. A switchable freewheeling ratchet unit providing clockwise and counterclockwise rotation comprising:

a sleeve having a bore and a first plurality of recesses extending into said sleeve from said bore;

a hub within said bore, said hub having a second plurality of recesses therein discontinuously positioned about said hub with at least one recess engagable in a clockwise rotational direction and at least one recess engagable in a counter clockwise rotational direction;

a plurality of locking ratchets resiliently held in said first plurality of recesses and engaging said second plurality of recesses such that in a driving rotational direction, said sleeve and hub are coupled with one another;

control means for disengaging said plurality of ratchets from said at least one clockwise recess or counter clockwise recess for enabling engagement with the other to provide rotation in both directions, said control means including a control ring pivotably mounted on said sleeve and at least one control element radially extending from said control ring, said control element including a first and second control face for engagement with faces on said plurality of ratchets and two adjacent locking ratchets are engaged with or disengaged from the second plurality of adjacent clockwise or counter clockwise recesses and said control element engages radially between the two associated locking ratchets; and switching means for switching said first and second control faces of said control element into and out of engagement with said ratchet faces for enabling clockwise and counter clockwise rotation of said ratchet unit.

2. The freewheeling ratchet unit according to claim 1 wherein said plurality of locking ratchets when disengaged by said control elements are held so as to be enclosed in said first plurality of recesses.

3. The freewheeling ratchet unit according to claim 2 wherein said control ring may be moved into a central position where said ratchets of said two locking ratchets simultaneously engage said at least one clockwise and counter clockwise recesses.

4. The freewheeling ratchet unit according to claim 1 wherein said at least one control element is designed to be mirror-symmetrical relative to radial axes of said sleeve and hub.

5. The freewheeling ratchet unit according to claim 1 wherein said sleeve constitutes a first coupling part and said control faces of the at least one control element extend underneath said plurality of locking ratchets.

6. The freewheeling ratchet unit according to claim 5 wherein said control faces of said at least one control element and said locking ratchets, in opposition to the driving direction of rotation, extend at a radially increasing distance relative to the axis of rotation.

7. The freewheeling ratchet unit according to claim 1 wherein said ratchet faces are arranged centrally relative to said locking ratchets and form part of a recess.

8. The freewheeling ratchet unit according to claim 1 wherein said at least one control element radially passes through an aperture in said sleeve.

9. The freewheeling ratchet unit according to claim 8 wherein said at least one control element is supported in its end positions in the circumferential direction on one of two circumferential limiting faces of said aperture.

10. The freewheeling ratchet unit according to claim 1 wherein said at least one control element is releasably connected to said control ring.

11. The freewheeling ratchet unit according to claim 1 wherein ramp faces extend from said sleeve for providing a fixed stop or a switching device for said control ring, said control ring including retaining lugs radially projecting beyond the contour of the control ring and depending on the directing of rotation, said retaining lugs are stopped or released by the ramp faces.

12. The freewheeling ratchet unit according to claim 11 wherein said switching means includes a radially resilient journal constituting a stop.

13. The freewheeling ratchet unit according to claim 11 wherein said switching means includes a pivotable angle lever with a pair of stop faces.

14. The freewheeling ratchet unit according to claim 1 wherein said control ring is loaded by a braking means.

15. The freewheeling ratchet unit according to claim 14 wherein a control sleeve comprising a control slot intersecting the axis of rotation is non-rotatingly, but, axially movably associated with said sleeve, a control pin radially projecting from said control ring is guided in said control sleeve such that said control sleeve is axially movable via a switching element which is externally operated and is engaged in a switching groove in said control sleeve.

16. A switchable freewheeling ratchet unit providing clockwise and counterclockwise rotation comprising:
a sleeve having a bore and a first plurality of recesses extending into said sleeve from said bore;
a hub within said bore, said hub having a second plurality of recesses therein with at least one recess engagable in a clockwise rotational direction and at least one recess engagable in a counter clockwise rotational direction;
a plurality of locking ratchets resiliently held in said first plurality of recesses and engaging said second plurality of recesses such that in a driving rotational direction, said sleeve and hub are coupled with one another;
control means or disengaging said plurality of ratchets from said at least one clockwise recess or counter clockwise recess for enabling engagement with the other to provide rotation in both directions, said control means including a control ring pivotably mounted on said sleeve and at least one control element extending from said control ring, said control element including a first and second control face for engagement with faces on said plurality of ratchets;
said sleeve constitutes a first coupling part and said control faces of the at least one control element extend underneath said plurality of locking ratchets and said control faces of said at least one control element and said locking ratchets, in opposition to the driving direction of rotation, extend at a radially increasing distance relative to the axis of rotation; and
switching means for switching said first and second control faces of said control element into and out of engagement with said ratchet faces for enabling clockwise and counter clockwise rotation of said ratchet unit.

* * * * *

UNITED STATES PATENT AND TRADEMARK OFFICE
CERTIFICATE OF CORRECTION

PATENT NO. : 5,170,870

DATED : December 15, 1992

INVENTOR(S) : Klaus Kampf

It is certified that error appears in the above-identified patent and that said Letters Patent is hereby corrected as shown below:

Column 1, lines 24-25, "patent Ser. No." should be --Patent No.--.

Column 4, line 61, "int" should be --in--.

Column 6, line 7, "2;" should be --21--.

Column 7, line 49, "directing" should be --direction--.

Column 8, line 30, "or" should be --for--.

Signed and Sealed this

Twenty-fourth Day of January, 1995

Attest:

BRUCE LEHMAN

Attesting Officer

Commissioner of Patents and Trademarks